United States Patent

[11] 3,625,556

| [72] | Inventor | Henry K. Stromberg |
| | | 377 Lloyd St., Cary, Ill. 60013 |
| [21] | Appl. No. | 865,140 |
| [22] | Filed | Oct. 9, 1969 |
| [45] | Patented | Dec. 7, 1971 |

[54] LOOPER
6 Claims, 28 Drawing Figs.

[52] U.S. Cl. .................................................. 289/17
[51] Int. Cl. .................................................. D03j 3/00
[50] Field of Search ........................................ 43/1; 289/17

[56] References Cited
UNITED STATES PATENTS

| 2,934,369 | 4/1960 | Kennedy | 289/17 |
| 3,101,964 | 8/1963 | Reaser | 289/17 |
| 3,396,998 | 8/1968 | Scoville | 289/17 |

Primary Examiner—Louis K. Rimrodt
Attorney—Greist, Lockwood, Greenawalt & Dewey

ABSTRACT: A tool for tying loops and knots, particularly useful in tying small loops or short leaders to small fish hooks and fishing flies.

PATENTED DEC 7 1971 3,625,556

INVENTOR
HENRY K. STROMBERG
By Darbo, Robertson & Vandenburgh
Attorneys

PATENTED DEC 7 1971

INVENTOR
HENRY K. STROMBERG
By Darbo, Robertson & Vandenburgh
Attorneys

LOOPER

BACKGROUND OF THE INVENTION

Fishermen commonly tie a loop at the end of a short leader to pass through the eyelet on a relatively large fishhook, pass the hook through the end of the loop and pull the loop end tightly around the shank of the hook. This has the advantage that the hook can be readily removed or changed on the leader by reversing the fastening process. However, this fastening process cannot be used in fastening tiny fly hooks to a line. First of all the eyelet is extremely small, and secondly manipulation of fine flies tends to damage or distort their shape. It is common practice to pass a single strand of relatively long leader through a fly hook eyelet and tie a fisherman's knot to hold the fly. The fisherman's knot is commonly tied by doubling the strand so that the eyelet is retained at the end of a loop or a "V," then twisting the doubled line four or five times and finally bringing a free end of line through the small loop between the eyelet and the first twist and pulling the resulting knot tight. This procedure has several disadvantages. The fact that the hooks must be handled with the fingers is a disadvantage due to the risk of puncture under relatively unsanitary conditions. Moreover, should the sportsman wish to change flies while standing in the stream, the technique described immediately above requires cutting the leader and fastening the remaining portion of the leader to a new fly. However, inasmuch as the threading of the eyelet and tying of the knot is commonly done at hours of the day when light conditions are unfavorable and is commonly done by individuals who find these tasks difficult because of the keen eyesight and because of the level of manual dexterity required, it would be highly desirable to provide techniques which eliminate the need of tying such leaders in the field, or which can be used in the field to facilitate the tying of the knots.

Heretofore, snelled hooks have been available and these hooks are provided with a pretied leader. However, the use of relatively long leaders permanently fixed to hooks is somewhat disadvantageous inasmuch as a large number of leaders frequently end in a tangle in the fisherman's fly box. This invention provides a tool with which the sportsman can tie very short leaders on his own flies and with which the sportsman can tie very small loops to flies. These small loops eliminate the need for the leaders heretofore commonly tied to hooks. These loops can be fastened to a lines-end loop just as large hooks are now fastened.

Because of its inherent physical properties synthetic fiber monofilament line is becoming extremely popular with sportsmen. This line has a slight disadvantage inasmuch as improperly tied knots tend to slide loose. For example, a loop can be incorporated in a line by doubling a portion of the line and tying a simple overhand knot in the doubled area to leave a loop tied beyond the knot. However, with monofilament line, such a knot will usually not hold under tension of the ends beyond the knot and the loop will pop itself out. Consequently a dependable loop can be tied only if several turns are provided in the line, e.g., a figure of eight knot. Heretofore, it has been virtually impossible to provide very short loops, e.g., less than one-half inch in length for engaging fishhook eyelets. The fact that a plurality of turns is virtually essential, plus the fact that the fishhook, e.g., a fly, must be handled in such a way as to avoid puncturing either the fingers or other articles by the fishhook, and the difficulties of manipulating the relatively dangerous hook and the excessive amount of line required to manually provide several turns for tying a reliable loop in the line has made it extremely difficult, if not virtually impossible to tie relatively small loops, e.g., less than half an inch in length, in line passing through a fishhook eyelet.

It is also desirable to be able to tie fishhooks with knots which engage the shank of the hook rather than just the eyelet. These knots have greatly increased strength inasmuch as the binding of the shank reduces the cutting tendency which causes some knots to fail. This invention provides a tool with which this can be done quickly and safely.

Also, the tool of this invention makes possible the tying of either very small or relatively large loops, which loops are dependable even when monofilament line is used. Moreover this invention makes possible the tying of relatively short-looped leaders to fine fishhooks such as those used with fishing flies. In addition this invention makes possible the tying of very small loops through the eyelet of fishhooks such as those used in fishing flies, these small loops making possible the elimination of longer leaders which tend to become tangled and snarled. Moreover, the use of this tool permits convenient tying of shank-engaging knots. However, it should be understood that the utilization of the tool of this invention is not limited to the tying of knots and loops by sportsmen, but is applicable in virtually every instance where loops and knots are tied particularly where relatively small loops are tied with relatively light line.

SUMMARY OF THE INVENTION

This invention relates to a tool for tying loops and knots and is particularly useful since it virtually eliminates the hazardous finger handling of fishhooks or flies while tying knots or loops through the eyelets thereof. The tool includes a line-receiving drum around which line can be wound, and from which the resulting turns of line can be slid axially off an end of the drum. The tool also includes fastening means (for securing line loops of fishhooks) positioned at the end of the drum over which the turns are removed, and means for shielding said fastening means from engagement by the turns of line sliding axially off the drum. In a preferred embodiment, the fastening means is a retractable hook which pulls line, or a fishhook to which line is secured, within the body of the drum, thus shielding not only the line-fastening means but the fishhook as well from engagement by the turns of line sliding axially off the drum.

DESIGNATION OF THE FIGURES

FIGS. 14 through 19 are positioned in the second sheet of drawings next to corresponding FIGS. 21 through 26. The steps illustrated by the individual corresponding figures are substantially identical, and the only difference is that in the sequence of FIGS. 14 through 19, an end-loop of line is secured by the tool, whereas in sequence illustrated in FIGS. 19 to 26, a fishhook is engaged by the tool.

DESCRIPTION OF PREFERRED EMBODIMENT

Figure 1:
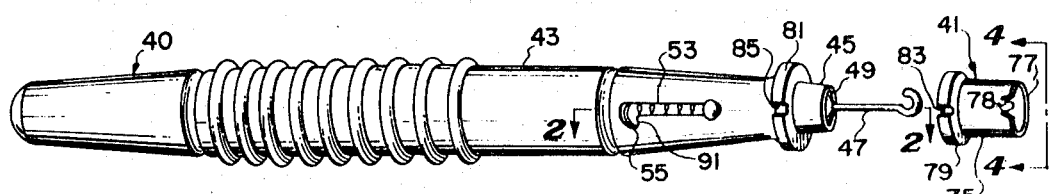
FIG. 1 is a perspective view of a preferred embodiment of this invention.

FIG. 1 shows tool, generally 40, and collar, generally 41, in separated condition. Tool 40 includes handle portion 43, winding drum 45, and retractable hook 47, which is extendable through end 49 of drum of 45. Handle portion 43 includes recess 51, bayonet slot 53 having enlarged portion 55. Retractable hook 47 is secured to carriage rod 57 which is slidable within axially oriented elongated recess 51, and compresses biasing spring 59 which also resides within recess 51. Carriage rod 57 is secured within recess 51 by pin 61 which is force-fit into recess 63 in carriage rod 57. It is noted that pin 61 is sufficiently elongated to extend through bayonet slot 53, beyond wall 65 and provide projecting portion 67. In the illustrated embodiment projecting portion 67 includes relatively narrow shaft portion 69 and enlarged rounded head 71. It is apparent from FIG. 2 that shaft 69 of pin 61 extends a short distance beyond wall 65.

Handle portion 40 is preferably manufactured by injection molding from a durable plastic material, e.g., Delrin. Recess 51 and bayonet slot 53 are incorporated by conventional use of core pins and the like during molding.

In order to assemble the tool, spring 59 is first inserted into recess 51, retractable assembly comprising hook 47 and carriage rod 57 is placed in recess 51 to compress spring 59 slightly. Pin 71 is then tapped into recess 53 to secure carriage rod 59 and to complete the assembly.

Collar, generally 41, is a hollow cylindrical attachment open at both ends. Collar 41 is adapted to fit snugly over drum 45 of tool 40, and when collar 41 is thus fixed to tool 40, it provides drum 75, which is equivalent to drum 45, except that the cylindrical free end 77 of collar 41 extends substantially further than end 49 of tool 40. This extension of the winding drum (45, 75) is particularly beneficial when fishhooks, or fly hooks are being manipulated. End 77 includes loop spreader notches 78 which are adjacent "V"-shaped notches.

In the illustrated preferred embodiment ridge, or flange, 79 extends outwardly well beyond the circumference of drum 75, and likewise ridge, 81, extends outwardly a substantial distance beyond the circumference of drum 45. Notches 83 and 85 in ridges 79 and 81, respectively, are preferably aligned when collar 41 is secured to drum 45. In the preferred illustrated embodiment, notch 85 is substantially axially aligned, or in a line, with bayonet slot 53. The reason for this will be appreciated hereinafter.

Also, in the preferred illustrated embodiment, collar 41 is internally fitted with slotted flexible disclike member 87 which, when collar 41 is seated on drum 45, rests against end 49 of tool 40. Diaphragm 87 includes a slot or other suitable opening 89 through which hook 47 can pass.

Basic Operation

Figure 2:
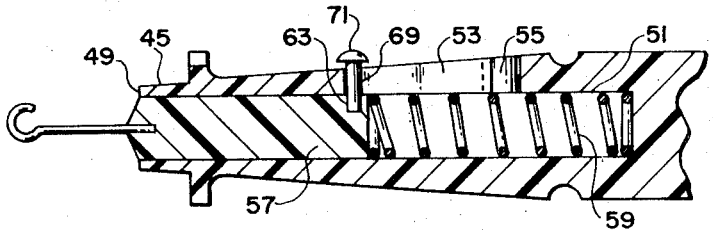
FIG. 2 is a fragmentary cross-sectional view taken approximately along the line 2—2 of FIG. 1.
Figure 3:
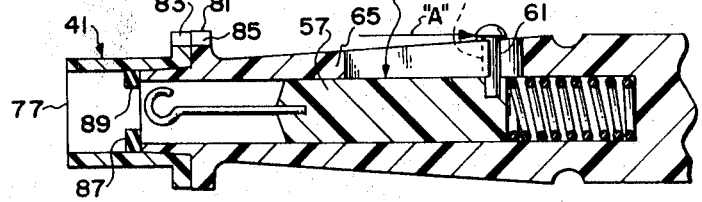
FIG. 3 is a fragmentary cross-sectional view taken as in FIG. 2 showing several components in a moved position, and showing a collar attachment attached.

In the condition of tool 40 illustrated in FIG. 2, hook 47 extends beyond end 49, and pin 69 resides at one extreme of bayonet slot 53. By engaging and sliding extending portion 67 of pin 61 as indicated by arrow "A" in FIG. 3, the movable assembly generally 90 comprising carriage rod 57 and hook 47 is moved deeply into recess 51. At this point, 61 can be pivoted into widened portion 55 of bayonet slot 53, and this pivoting causes assembly 90 to pivot likewise. Enlarged portion 55 of bayonet slot 53 includes a forwardly extending portion 91. Spring 59 biases pin 61 into extending portion 91 of slot 53, thus locking hook 47, and carriage rod into retracted condition illustrated in FIG. 3.

Pushing pin 61 out of enlarged portion 55 of bayonet slot 53 frees the movable assembly 90 for return to the hook-extended condition illustrated in FIG. 2 and, indeed, spring 59 slides the movable assembly to that condition.

Operation

In the description which follows the use of the looper of this invention is illustrated in connection with tying knots and loops in fishhook eyelets and at the end of fishing line. It should be emphasized however that the utilization of this tool is not limited to this use. Nonetheless, this tool provides a substantial advance in the art of tying knots and loops, and particularly, makes possible the tying of relatively short looped leaders and relatively small loops for use in conjunction with relatively small fly hooks.

Figure 5:
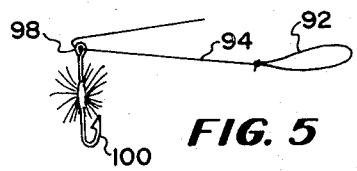
FIGS. 5, 6 and 7 illustrate the kinds of knots, leaders, and loops, which can be conveniently tied using the tool of this invention.

Thus, as illustrated in FIG. 5, loop 92 can be tied in monofilament fishing line 94. This is accomplished using the sequence of steps illustrated in FIGS. 14 through 19, inclusive.

Figure 6:
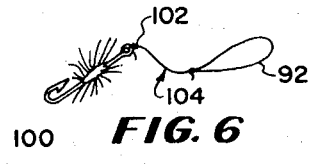

A free end 96, when passed through eyelet 98 in fly hook, generally 100, can be tied into a "fisherman's knot" illustrated in FIG. 6 to provide a short length loop leader, generally 104. This is accomplished using the sequence of steps illustrated in FIGS. 8 through 13 inclusive.

Figure 25:
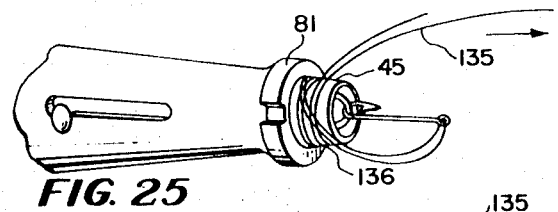
Figure 19:
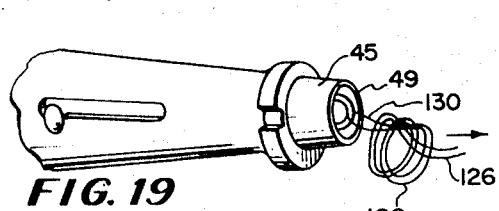
Figure 26:
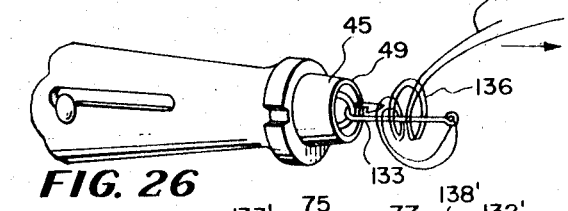
Figure 27:
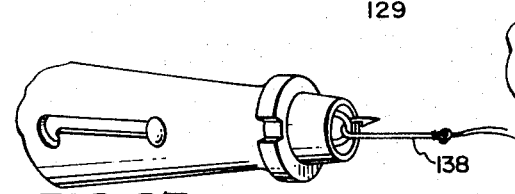

A shank-engaging knot, illustrated at FIG. 27, is accomplished by the procedure illustrated in FIGS. 21 through 26.

Figure 7:
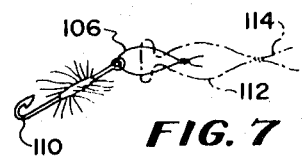
Figure 28:
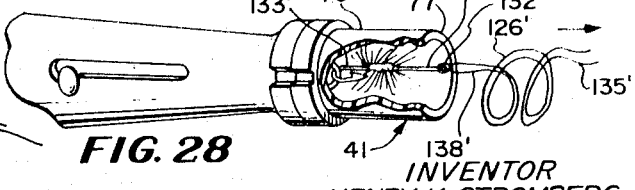
FIG. 28 illustrates the condition obtained after a fly hook is used in a knot-tying sequence of FIGS. 20 through 27, when the collar illustrated in FIG. 1 is in place.

Also, use of this invention makes practical the tying of a very small loop 106 in eyelet 108 of fly hook 110 as illustrated in FIG. 7. The structure illustrated in FIG. 7, i.e., the hook-loop combination, is extremely useful inasmuch as loop 106 provides a convenient fastening means for a loop 112 at the end of leader 114 as indicated by dashed lines in FIG. 7. This is done as illustrated in FIGS. 21 through 25, except that collar 41 is used and turns are stepped beyond hook shank to give a small loop, as illustrated in FIG. 28.

The applications of the use of this invention illustrated in FIGS. 5, 6 and 7 are for illustration purposes and it is to be understood that the invention is useful for loop, generally, e.g., along a run of trot line etc.

"Fisherman's Knot"

Figure 4:
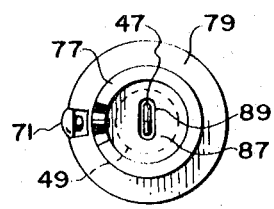
FIG. 4 is an end view taken approximately along the line 4—4 of FIG. 1.
Figure 8:
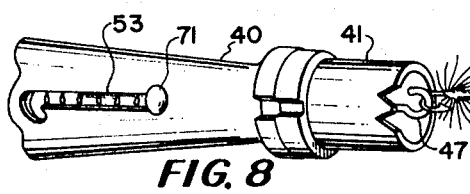
FIGS. 8 through 13 illustrate the sequence of steps used to tie a knot sometimes referred to as a "fisherman's knot" or "hangman's knot" to the eyelet of a fishhook.
Figure 9:
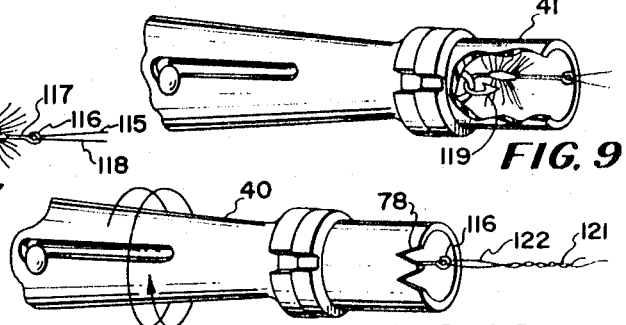
Figure 10:
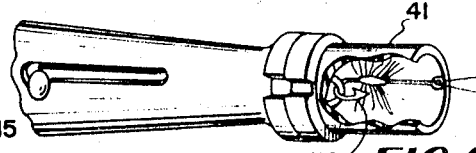
Figure 11:
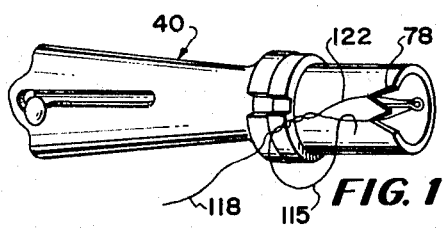
Figure 12:
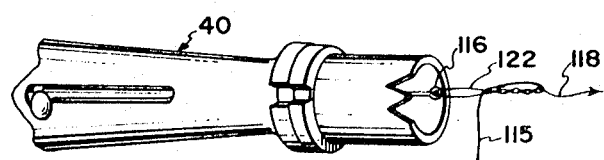
Figure 13:
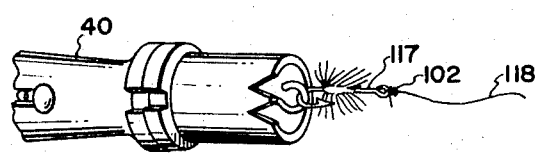

A knot commonly referred to as a fisherman's knot is begun by first threading an end 115 of line through eyelet 116 of fly 117 and pulling end 115 back along line 118 to form a "V" as illustrated in FIG. 8. Fly 117 is then secured around hook 47 with collar 41 in place on tool 40. Knob 71 is then moved in slot 53 away from collar 41 to the position shown in FIG. 9 in which hook 47, and fly 117 is retracted into collar 41. As perhaps best appreciated from a consideration of FIG. 4, fly 117, in the retracted position, will bear against the outer face of disc 87 as hook 47 passes through slot 89. The slight rotation of assembly 90 when pin 61 is pivoted to seat in lock notch 91 causes the fly 117 to twist against disc 87. Thus, the tool withdraws fly 117 into the protected region within collar 41 thus protecting fly 117 from injury during the tying of the knot, and shielding barb 119 from contact with the operator's fingers. Tool 40 is then rotated while the "V" formed by line 118 and end 115 is held in the operator's fingers to provide twists 121 as illustrated in FIG. 10. It is noted that because of the "memory" of the line, loop 122 tends to remain between eyelet 116 and twists 121. Loop 122 is then brought down over spreader notches 78 as illustrated in FIG. 11 to widen the loop to facilitate passage of end 115 therethrough. When end 115 is passed a sufficient distance through loop 122 line 118 is pulled sharply as illustrated in FIG. 12, and this completes the tying of the so-called "fisherman's knot."

It is noted that the fisherman's knot firmly engages eyelet 116 of fly 117 thus fixing fly 117 with respect to line 118. Consequently, any movement of the line 118 is transferred to fly 117, and, likewise, any movement of fly 117 must be accompanied by a movement of the line 118. This is considered by some sportsmen somewhat undesirable since it does not permit the fly to dangle or move freely and, independently of line 118, thus creating what is believed to be an artificial impression as the fly lays on the water. I consider it more desirable that fly 117 be secured to line 118 by a small loop such as that illustrated in FIG. 7, inasmuch as the small loop does not restrict independent, natural motion of the fly when it is laying on the surface of the water. Nonetheless a very short looped leader, e.g., 2 inches or less, illustrated in FIG. 6 can be tied using the tool of this invention. To provide a short leader, it is recommended that a line loop be tied first and that a fisherman's knot be tied close to the line loop as a second step.

Line-Loop

Figure 14:
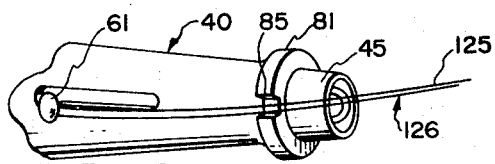
FIGS. 14 through 19 illustrate the sequence of steps utilized to tie a loop in a line using the tool of this invention.
Figure 21:
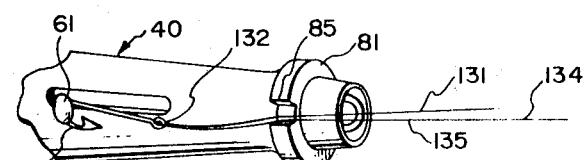
Figure 15:
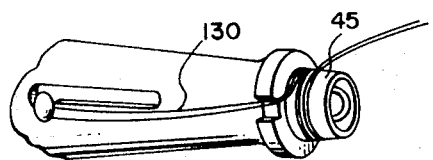
Figure 16:
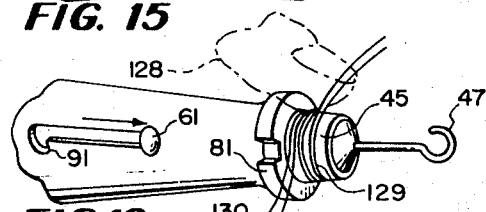

The procedure for making a line loop is illustrated in FIGS. 4 through 19. The same procedure is used to make a lines end loop, or a series of spaced-apart loops along a trot line. Collar attachment 41 may be fixed to drum 45, while loops are tied, in which case the procedure is identical to that illustrated in FIGS. 14 through 19. In the procedure of FIGS. 14 through 19, collar 41 is not shown used. Line 125 is passed around pin 61 to provide doubled-line portion 126. FIG. 14 shows pin 61 in retracted position. Doubled portion 126 is then passed through notch 85 in ridge 81 as shown in FIG. 14, and thence wound around drum 45 at least two complete turns past notch 85 as illustrated in FIG. 15. As illustrated in FIG. 16 one finger 128 holds turns 129 on drum 45 while pin 61 is pivoted clear of locking notch 91 and is automatically urged forward by spring 59. This automatic motion accomplishes three things. First of all end loop 130 is released; secondly, because of the presence of ridge 81, the "memory" of the line causes loop 130 to flip outwardly as illustrated in FIG. 16; thirdly as explained above, sliding of pin 61 along slot 53 accompanies extension of hook 47 into position for engaging a loop.

Figure 17:
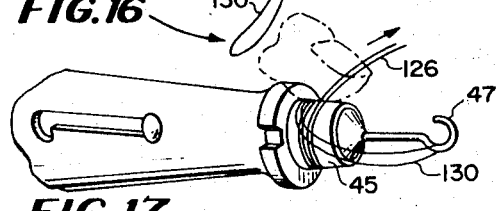
Figure 18:
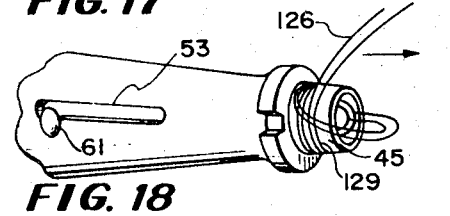

At this point an adjustment in the size of loop 130 may be made depending on whether a larger or smaller tied loop is required. If a relatively large loop is required loop 130 is pulled tangentially away from drum 45, thus causing turns 129 to slide circumferentially around drum 45 making loop 130 larger. Should a smaller loop be required it is preferred that loop 130 be placed for engagement with hook 47 as illustrated in FIG. 17, and with finger 128 still in place, doubled line 126 be pulled tangentially away from drum 45 as indicated by the arrow in FIG. 17. This causes turns 129 to slide circumferentially around drum 45 in the opposite direction, taking all the slack out of loop 130, thus diminishing the size of loop 130. Pin 61 is then pushed rearwardly to provide the hook-retracted position illustrated in FIG. 18. Doubled line 126 is then released by finger 128 and is pulled axially off drum 45 as illustrated by the arrow of FIG. 18. This causes turns 129 to slide axially off end 49 of drum 45 whereby continued pulling of line 126 causes turns 129 to tighten leaving loop 130 securely tied. Pivoting of pin 61 into bayonet slot 53 permits springs 59 to push hook 47 into the extended position automatically, e.g., as seen in FIG. 16, whereupon securely tied loop 130 can be readily removed from hook 47.

Shank-Engaging Knot

Figure 20:
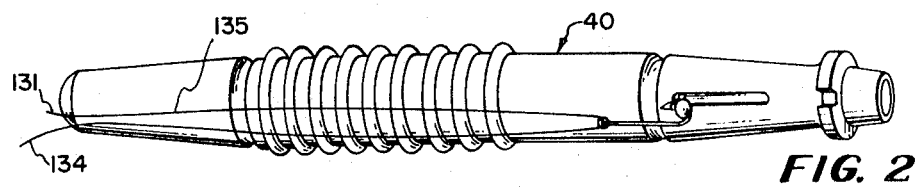
FIGS. 20 through 27 illustrate the sequence of steps utilized to tie a shank-engaging knot.
Figure 22:
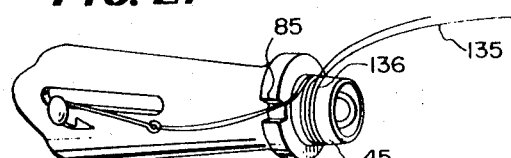
Figure 23:
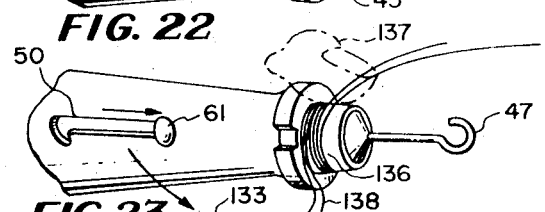
Figure 24:
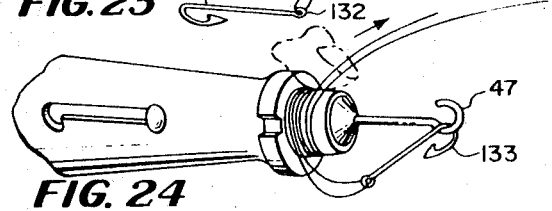

A free end 131 of line 134 is passed through eyelet 132 of hook 133 and pulled back along line 134 to form a doubled-line portion 135. As illustrated in FIG. 20, it is preferred that tool 40 be of sufficient length to permit its use as a gage to quickly determine the length of doubled line 135 which will be required to provide adequate length for winding more than two complete turns around drum 45. With pin 61 of tool 40 in retracted position as indicated in FIG. 20, hook 133 is secured around pin 61, and doubled line portion 135 is passed through notch 85 in ridge 81. It will be appreciated that the sequence of steps illustrated by FIGS. 21 through 25 are identical to the sequence of steps illustrated in FIGS. 14 through 18 respectively. Hence, double portion 135 is then wound around drum 45 to provide at least two complete turns 136 past notch 85 as illustrated in FIG. 22. A finger 137 secures turns 136 in place on drum 45 while pin 61 is released and permitted to slide along bayonet slot 53 towards drum 45. This extends tool hook 47 into the position illustrated in FIG. 23, simultaneously releases fishhook 133 from pin 61, and because of the "memory" of doubled line 135 in the region of end loop 138, both end loop 138 and fishhook 133 pop outwardly as indicated in FIG. 23 making it very convenient to grasp either loop 138 or eyelet 132 for safe manipulation of fishhook 133. Hook 133 is then positioned to engage tool hook 47, as illustrated in FIG. 24 and tool hook 47 is retracted by sliding pin 61 in slot 53 away from ridge 81. As illustrated in FIG. 25, pulling doubled-line portion 135 off drum 45 as suggested in FIG. 25 causes turns 136 to slide axially off end 49 of drum 45. Inasmuch as the shank 138 of fishhook 133 is not protected within drum 45, turns 136 fall and tighten, around shank 138 of hook 133 as illustrated in FIG. 26. Continued pulling of doubled line 138 in a radial direction, i.e., perpendicular to shank 138, results in a knot as shown in FIG. 27 in which the line is secured directly to shank 138.

Small Loop on Fly

In order to attach a small loop to a fishing fly as illustrated in FIG. 7, the procedure illustrated in FIGS. 20 through 25 are repeated except that collar 41 is seated on drum 45 during the entire procedure, and except that doubled line 135 is wound around drum 75 of collar 41. Furthermore during the step illustrated at FIG. 23 or 24, the loop-size adjustment can be made. Hence, should relatively large loop be desired, loop 138 is pulled tangentially to slide turns 136 circumferentially around drum 75 thus increasing the size of loop 138. Should it be desirable to provide a smaller loop, doubled portion 135 is drawn tangentially to slide turns 136 circumferentially around drum 75 to take all slack out of loop 138. This loop size adjustment can be done at any time prior to sliding turns 138 off collar drum 75. Hence, as doubled portion 135' shown in FIG. 28 is pulled axially to draw turns 126' off end 77 of drum 75, turns 126' leave drum 77 beyond shank 138' of hook 133'. Continued pulling of doubled-line portion 135' tightens turns 126' around line 135 near eyelet 132', to leave loop 138' securely tied. Turns 126' can be further restricted in their movement beyond end 77 by drawing doubled line 135' between fingers placed over end 77 to prevent turns 126' from passing therebetween. This causes turns 126' to tighten down around loop 138' quite close to eyelet 132' in which case securely tied loop 138' is particularly small.

ACHIEVEMENT

The tool of this invention is characterized by simplicity and economy of manufacture and assembly. Furthermore the tool facilitates safe and secure tying of knots and loops, and is particularly useful in tying monofilament lines to fishing hooks and flies. The time required to tie a line loop using the sequence of steps illustrated in FIGS. 14 through 19 herein to produce a loop such as line loop 92 shown in FIG. 5 is about 10 seconds, more or less, depending on the skill of the operator. The time required to tie a loop similar to loop 106 in FIG. 7 to a fly using the procedure outlined in FIGS. 20 through 25 and as shown in FIG. 28 is between 10 and 15 seconds, more or less, depending on the skill of the operator. The time required to tie a shank-engaging knot, similar to that illustrated in FIG. 27, using the procedure outlined in FIGS. 21 through 26 is also between 10 and 15 seconds. The time required to prepare a short looped leader attached to a fishing fly as illustrated in FIG. 6 including the time required to tie loop 92 and fisherman's knot 102 is between 30 and 40 seconds, more or less, depending on the skill of the operator.

Moreover, when at least two turns are made around drum 45 (or drum 75) the resulting loops resist pullout when the lead lines are pulled in opposite directions.

The novel looped fly illustrated in FIG. 7 is conveniently attached to a lines end loop 112, thus eliminating the need to cut leaders to change flies, and eliminating the need for tying knots at the fishing site. Using the tool of this invention, the novel fly loop structure of FIG. 7 can be quickly and safely prepared and the size of loop 106 can range from less than one-fourth inch to several inches in diameter. I have found that looped flies of the type illustrated in FIG. 7 in which the loop is less than one-half inch in diameter are extremely advantageous. The probability of leader tangle in a tackle box is virtually eliminated with the small loops; and removing, or fastening a looped fly from or to, a line is extremely convenient, since these small loops provide a relatively large opening through which to pass a lines end loop for removing or fastening fly 110 to line 114. Moreover, use of less than one-half inch diameter loop 106 tied from monofilament line does not add a substantial weight to the fly loop assembly. Some hardware-type connectors presently available inherently involve the undesirable addition of substantial weight to the hook or fly. Moreover, using the novel loop attachment disclosed in FIG. 7, hook 110 is not rigidly fixed with respect to loop 106 inasmuch as hook 110 can dangle and move somewhat naturally and independently of the movement of loop 106. This permits more natural action of fly 110 when resting on the water. Its motion is not completely limited by line 114 and loop 106.

I claim:

1. A tool for tying loops comprising an elongated handle having an elongated substantially cylindrical recess extending axially into the handle from a first end thereof;

said handle having a line-receiving first sidewall portion at said end;

said handle including a second sidewall portion surrounding said elongated substantially cylindrical recess, said second sidewall portion having an elongated axially extending bayonet slot therethrough;

carriage means movable within said recess, said carriage means having an outer end thereof;

fastening means secured to said carriage means at said outer end thereof, said fastening means being adapted to secure a loop thereon;

bias means for urging the outer end of said carriage means towards said first end;

operating handle means fixed to said carriage means, and passing through said bayonet slot for moving said carriage means to a first position and to a second position;

said fastening means being retracted within said recess when said carriage means is in said first position, said fastening means being extended beyond the end of said line-receiving first sidewall portion when the carriage means is in the second position.

2. The tool as in claim 1 in which said cylindrical drum has a ridge at the inner end thereof, said ridge rising abruptly radially from said drum, said ridge having a notch therein, said notch being aligned with said slot.

3. The looper of claim 1 in which the end of the first sidewall includes a plurality of closely adjacent "V"-shaped notches.

4. A tool for tying loops, and for tying knots on fishhooks and the like, said tool comprising an elongated handle having a recess extending axially into the handle from a first end thereof;

said handle having a line-receiving first sidewall portion at said first end;

said handle including a second sidewall portion surrounding said elongated recess, said second sidewall portion having an elongated substantially axially extending bayonet slot therethrough;

carriage means movable within said recess, said carriage means having an outer end thereof;

fastening means secured to said carriage means at said outer end thereof, said fastening means being adapted to secure a loop thereon;

bias means for urging the outer end of said carriage means in the general direction of said first end;

operating handle means fixed to said carriage means and passing through said bayonet slot for moving said carriage means to a first position and to a second position;

said fastening means being retracted within said recess when said carriage means is in said first position, and a portion of said fastening means being extended beyond the end of said line-receiving first sidewall portion when the carriage means is in the second position.

5. The tool of claim 4 wherein said fastening means includes a hook, and which includes a removable collar element seated on said first sidewall portion, said collar element including a flexible diaphragm extending radially within said collar, said diaphragm having an opening therein, and in which tool said fastening means extends through said opening in said diaphragm, and in which said hook is positioned adjacent said diaphragm when said carriage means is in said first position, at which position an article engaged by said hook is pressed against said diaphragm.

6. In a tool for tying a line to a hook having a hook portion, a shank and an eyelet, in which the tool includes an elongated handle which is hollow at one end thereof, and which includes fastening means for engaging said hook portion and retracting means for drawing said hook portion within said hollow at the end of the handle, the improvement which comprises a flexible diaphragm extending radially within the hollow handle, said diaphragm having an opening through which said fastening means passes, and said retracting means including means for drawing said hook portion against said flexible diaphragm when said fastening means is in a retracted position within said hollow.

* * * * *